United States Patent
Yan et al.

(10) Patent No.: US 11,723,010 B2
(45) Date of Patent: Aug. 8, 2023

(54) METHODS AND APPARATUS TO FACILITATE USER EQUIPMENT BEAM SELECTION BASED ON SERVICE DEMANDS

(71) Applicant: QUALCOMM Incorporated, San Diego, CA (US)

(72) Inventors: Hongbo Yan, Vista, CA (US); Raghu Narayan Challa, San Diego, CA (US); Mihir Vijay Laghate, San Diego, CA (US); Benjamin Cheadle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 16/913,865

(22) Filed: Jun. 26, 2020

(65) Prior Publication Data

US 2020/0413394 A1   Dec. 31, 2020

Related U.S. Application Data

(60) Provisional application No. 62/867,523, filed on Jun. 27, 2019.

(51) Int. Cl.
*H04W 72/044* (2023.01)
*H04B 7/06* (2006.01)
*H04W 52/30* (2009.01)

(52) U.S. Cl.
CPC ........ *H04W 72/046* (2013.01); *H04B 7/0608* (2013.01); *H04W 52/30* (2013.01)

(58) Field of Classification Search
CPC . H04W 72/046; H04W 52/30; H04W 52/146; H04W 52/248; H04W 52/42;
(Continued)

(56) References Cited

U.S. PATENT DOCUMENTS

2017/0332407 A1* 11/2017 Islam .................... H04W 52/42
2018/0263024 A1*  9/2018 John Wilson ....... H04W 72/082
(Continued)

FOREIGN PATENT DOCUMENTS

WO       2017196612 A1    11/2017
WO    WO-2019166110 A1 *  9/2019 ............. H01Q 5/392

OTHER PUBLICATIONS

International Search Report and Written Opinion—PCT/US2020/040016—ISA/EPO—dated Oct. 2, 2020.

*Primary Examiner* — Ashley Shivers
(74) *Attorney, Agent, or Firm* — Procopio, Cory, Hargreaves & Savitch

(57) ABSTRACT

Apparatus, methods, and computer-readable media for facilitating UE beam selection based on service demands are disclosed herein. An example method of wireless communication includes determining to select an UL beam having a higher EIRP capability than an EIRP capability associated with a current beam for transmitting on UL when at least one of a target transmit power based on a TPC exceeds an EIRP capability associated with the current beam or when an amount of data in a buffer of the UE is greater than a data threshold. The example method also includes determining, upon determining to select the UL beam, a set of UL beams with an EIRP capability satisfying an EIRP capability threshold and a respective beamforming direction corresponding to a beamforming direction associated with the current beam, selecting one UL beam of the set of UL beams, and transmitting on UL on the selected UL beam.

29 Claims, 7 Drawing Sheets

(58) Field of Classification Search
CPC .... H04B 7/0608; H04B 7/0404; H04B 7/088; H04B 17/382; H04B 17/318; H04B 17/336; H04B 7/0695
See application file for complete search history.

(56) References Cited

U.S. PATENT DOCUMENTS

| | | | |
|---|---|---|---|
| 2019/0159135 A1* | 5/2019 | MolavianJazi | H04W 52/362 |
| 2019/0166645 A1* | 5/2019 | Sadiq | H04W 76/19 |
| 2021/0227542 A1* | 7/2021 | Li | H04W 72/02 |

* cited by examiner

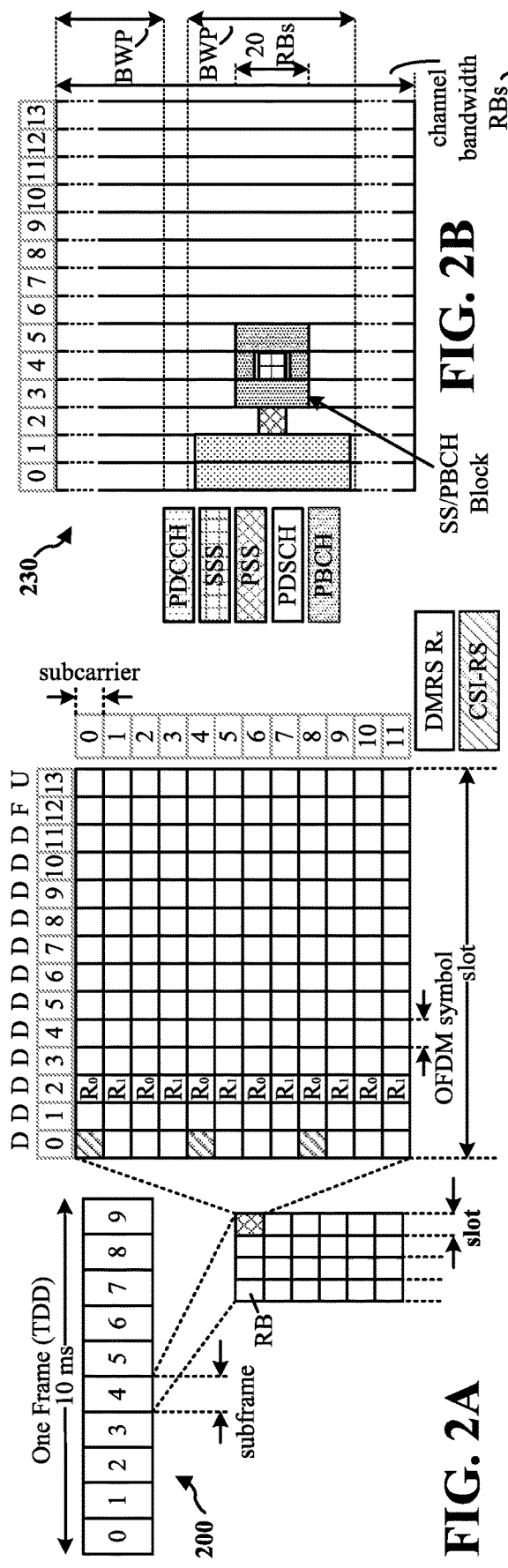
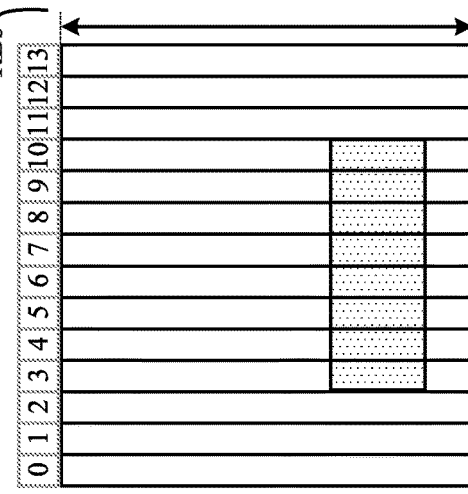
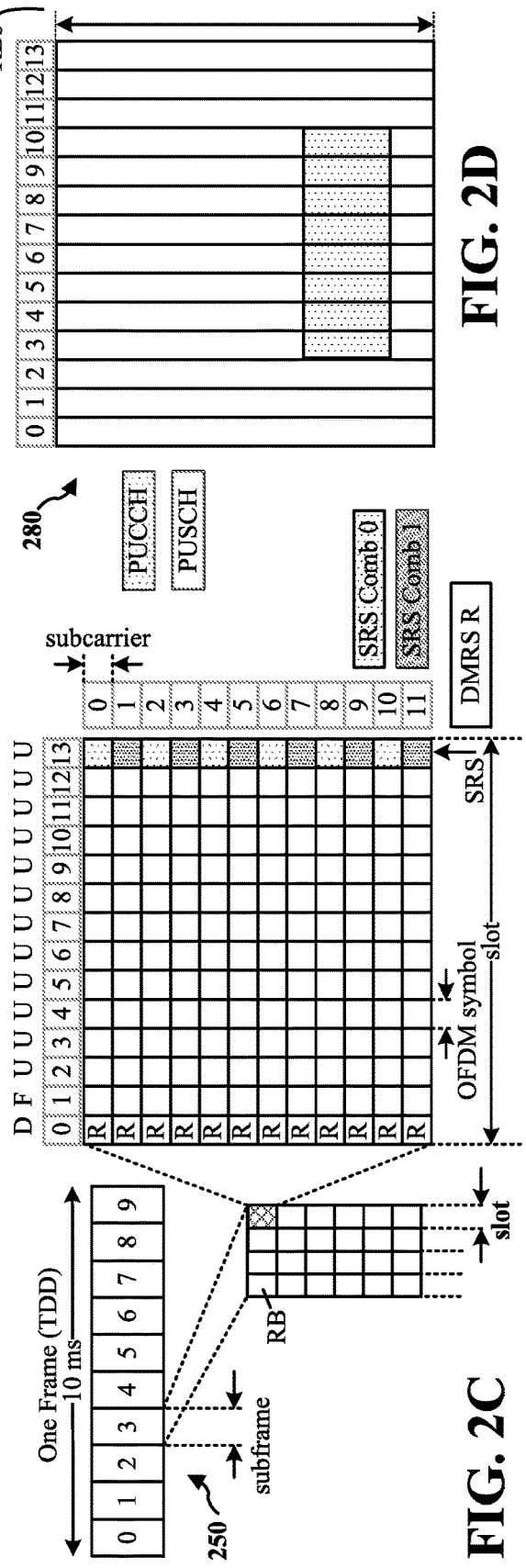
FIG. 2A
FIG. 2B
FIG. 2C
FIG. 2D

METHODS AND APPARATUS TO FACILITATE USER EQUIPMENT BEAM SELECTION BASED ON SERVICE DEMANDS

CROSS REFERENCE TO RELATED APPLICATION(S)

This application claims the benefit of U.S. Provisional Patent Application Ser. No. 62/867,523, entitled "METHODS AND APPARATUS TO FACILITATE USER EQUIPMENT BEAM SELECTION BASED ON SERVICE DEMANDS," and filed on Jun. 27, 2019, which is expressly incorporated by reference herein in its entirety.

BACKGROUND

Technical Field

The present disclosure relates generally to communication systems, and more particularly, to methods and apparatus to facilitate user equipment (UE) beam selection based on service demands.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When communicating via millimeter wave (mmW) frequencies, different beams may be selected at different times for transmitting signals/messages and/or other information. A UE selecting a beam may operate under uplink (UL)/downlink (DL) correspondence or no correspondence. In some examples, a UE operating under UL/DL correspondence may use the same beam (or nearly the same beam) for UL and DL. For example, the UE may receive a DL communication via a first beam and select the same beam for transmitting on uplink. In other examples when the UE is not operating under UL/DL correspondence, the UE may select different beams for receiving DL communications and for transmitting UL communications. In any case, at least one beam is selected.

For downlink communications, thermal noise may be a limiting factor in a downlink communication being properly received at, for example, a UE. In contrast to downlink communications, for uplink communications, other UE interference and/or thermal noise at the base station may be limiting factors in an uplink transmission being properly received at, for example, the base station. In such examples, noise at the transmitting UE may be considered secondary and/or negligible when compared to the noise at the receiving base station.

An example factor in determining the UE transmit power of a beam is the quantity of antenna elements associated with the beam. For example, an antenna element may be coupled to a power amplifier, which provides a physical limit of radio frequency power that may be emitted by the antenna element. The radio frequency power may be referred to as effective (or equivalent) isotropic radiated power (EIRP). Thus, each antenna element may be associated with a maximum EIRP.

When performing beamforming, signals output from one or more antenna elements at a device may be modified so that the signals add up constructively at the receiving device. For example, for a two-element beam, respective weights and phase-shifts may be applied to the signals output by each antenna element so that the signals from the two antenna elements are phase-aligned when received at the receiving device. Thus, it may be appreciated that a beam may be associated with an EIRP capability based on the quantity of antenna elements associated with the beam and the characteristics associated with forming the beam.

Thus, as described above, there may be different benefits for selecting a beam on downlink and a beam on uplink. Example techniques disclosed herein facilitate selecting a UE beam based on service demands of the UE. For example, techniques disclosed herein monitor for an occurrence of a UE beam selection triggering event and facilitate the selecting of a UE beam when a UE beam selection trigger event is detected.

By selecting a UE beam after detecting the occurrence of a UE beam selection triggering event, examples disclosed herein may facilitate improving performance of uplink transmissions and/or increasing throughput at a base station when the base station takes advantage of transmitting via the UE beam associated with a relatively higher EIRP capability.

In an aspect of the disclosure, a method, a computer-readable medium, and an apparatus are provided for wireless communication at a UE. An example apparatus determines to select an UL beam having a higher EIRP capability than an EIRP capability associated with a current beam for transmitting on UL when at least one of a target transmit power based on a transmit power control (TPC) exceeds an EIRP capability associated with the current beam or when an amount of data in a buffer of the UE is greater than a data threshold. The example apparatus also determines, upon determining to select the UL beam, a set of UL beams with an EIRP capability satisfying an EIRP capability threshold and a respective beamforming direction corresponding to a beamforming direction associated with the current beam. The example apparatus also selects one UL beam of the set of UL beams, and transmits on UL on the selected UL beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
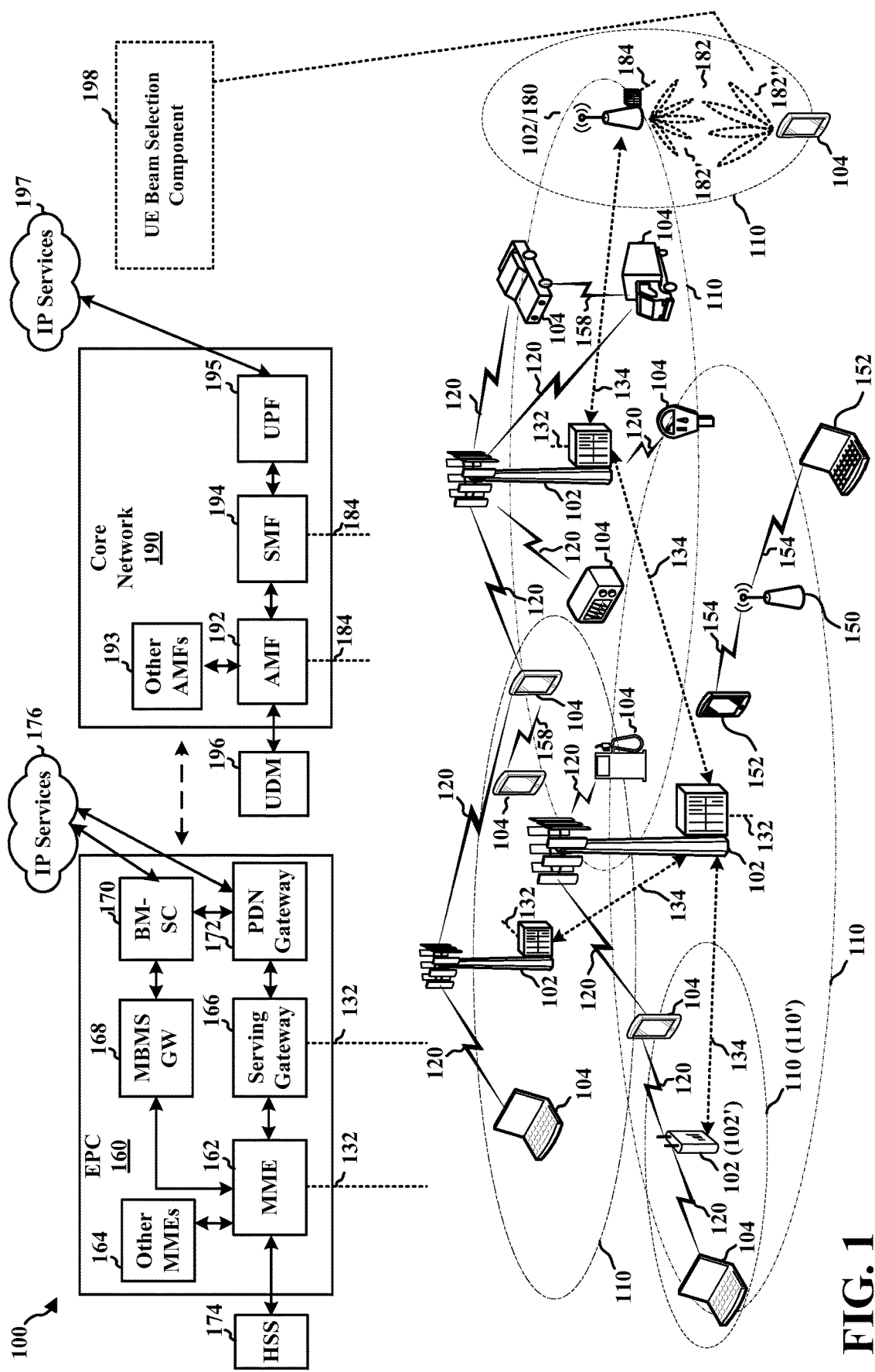
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

When performing beamforming, signals output from one or more antenna elements at a device may be modified so that the signals add up constructively at the receiving device. For example, for a two-element beam, respective weights and phase-shifts may be applied to the signals output by each antenna element so that the signals from the two antenna elements are phase-aligned when received at the receiving device. Thus, it may be appreciated that an antenna element may be associated with a maximum EIRP, and that a beam may be associated with an EIRP capability based on the quantity of antenna elements associated with the beam and the characteristics associated with forming the beam.

Aspects presented herein enable a wireless communication devices, such as a UE 104, to select a UE beam based on service demands of the UE. For example, techniques disclosed herein monitor for an occurrence of a UE beam selection triggering event and facilitate the selecting of a UE beam when a UE beam selection trigger event is detected. In some examples, the UE may detect a UE beam selection triggering event based on a target transmit power. In some examples, the UE may detect a UE beam selection triggering event based on an amount of data in a buffer for transmitting via uplink.

In some examples, a wireless communication device, such as a UE 104, may be configured to manage one or more aspects of wireless communication by facilitating selecting a beam for communication based on uplink service demands. As an example, in FIG. 1, the UE 104 may include a UE beam selection component 198 configured to determine to select a UL beam having a higher EIRP capability than an EIRP capability associated with a current beam for transmitting on UL when at least one of a target transmit power based on TPC exceeds an EIRP capability associated with the current beam or when an amount of data in a buffer of the UE is greater than a data threshold. The UE beam selection component 198 may also be configured to determine, upon determining to select the UL beam, a set of UL beams with an EIRP capability satisfying an EIRP capability threshold and a respective beamforming direction corresponding to a beamforming direction associated with the current beam. The UE beam selection component 198 may also be configured to select one UL beam of the set of UL beams, and to transmit on UL on the selected UL beam.

Although the following description provides examples directed to 5G NR (and, in particular, to transmissions via mmW frequencies), the concepts described herein may be applicable to other similar areas, such as LTE, LTE-A, CDMA, GSM, and/or other wireless technologies, in which a UE may select a beam based on UL service demands (e.g., uplink-centric beam selection techniques).

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the pathloss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
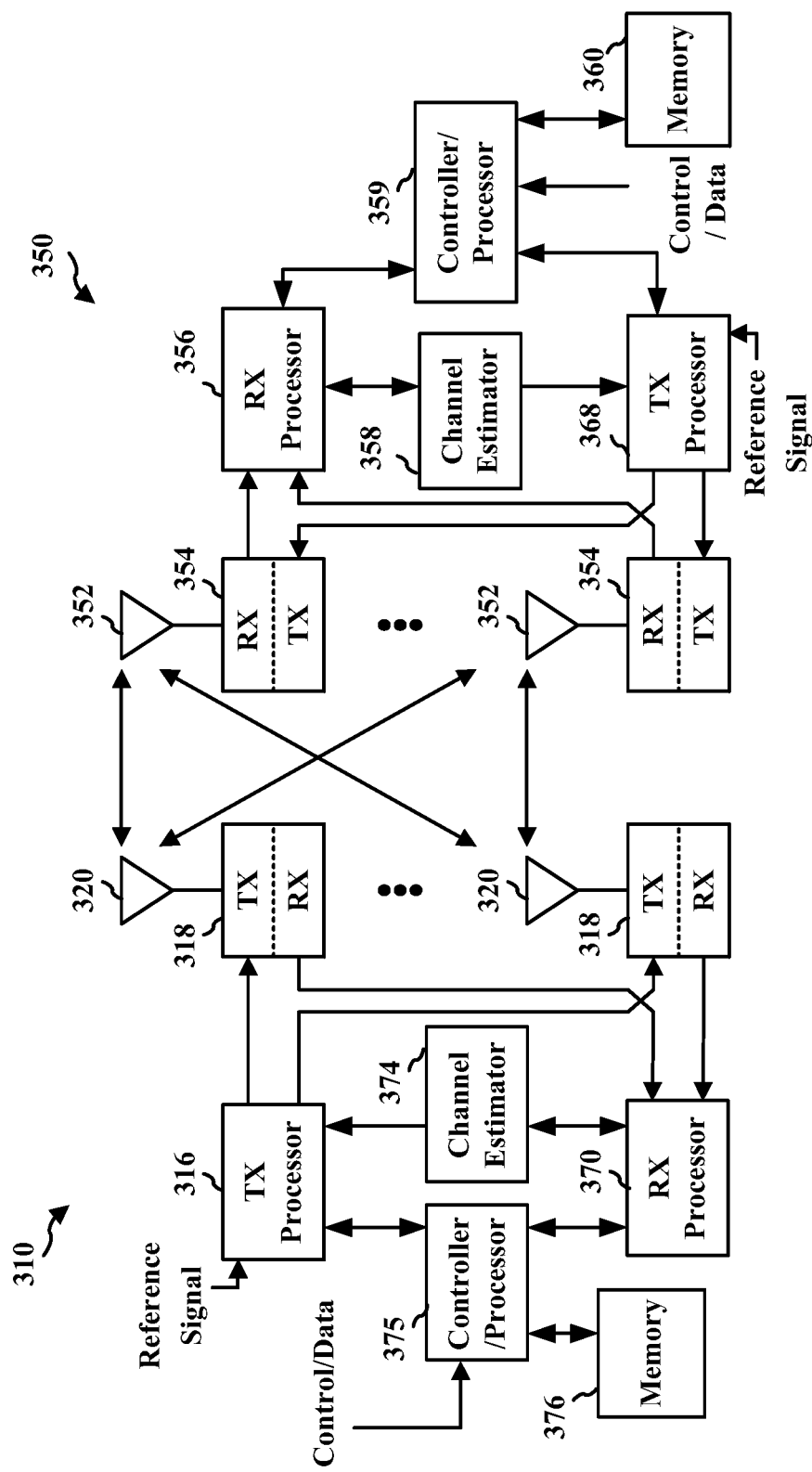
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE beam selection component 198 of FIG. 1.

When communicating via mmW frequencies, different beams may be selected at different times for transmitting signals/messages and/or other information. A UE selecting a beam may operate under UL/DL correspondence or no correspondence. In some examples, a UE operating under UL/DL correspondence may use the same beam (or nearly the same beam) for UL and DL. For example, the UE may receive a DL communication via a DL beam and select the same beam for transmitting on uplink. In other examples when the UE is not operating under UL/DL correspondence, the UE may select different beams for receiving DL communications and for transmitting UL communications. In any case, at least one beam is selected.

For downlink communications, thermal noise may be a limiting factor in a downlink communication being properly received at, for example, a UE. Thus, when selecting a DL beam, a base station may select a beam that produces the least pathloss and/or based on a quality metric, such as signal-to-noise ratio (SNR). In some examples, the base station may directly calculate the SNR of a beam. In other examples, the base station may indirectly estimate the SNR of a beam based on, for example, a reference signal received power (RSPR) and/or a quantity of antenna elements associated with the beam.

In contrast to downlink communications, for uplink communications, other UE interference and/or thermal noise at the base station may be limiting factors in an uplink transmission being properly received at, for example, the base station. In some such examples, noise at the transmitting UE may be considered secondary and/or negligible when compared to the noise at the receiving base station. Thus, increasing the UE transmit power reduces the SNR at the base station and improves the likelihood of an uplink communication being properly received at the base station.

In some examples, the UE may determine the UE transmit power of a beam based on a quantity of antenna elements associated with the beam. For example, an antenna element may be coupled to a power amplifier that provides a physical limit of radio frequency power that may be emitted by the antenna element. The radio frequency power may be referred to as EIRP. Thus, each antenna element may be associated with a maximum EIRP.

When performing beamforming, signals output from one or more antenna elements at a device may be modified so that the signals add up constructively at the receiving device. For example, for a two-element beam, respective weights and phase-shifts may be applied to the signals output by each antenna element so that the signals from the two antenna elements are phase-aligned when received at the receiving device. Thus, it may be appreciated that an antenna element may be associated with a maximum EIRP, and that a beam may be associated with an EIRP capability based on the quantity of antenna elements associated with the beam and the characteristics associated with forming the beam.

Thus, as described above, there may be benefits for selecting a beam on downlink and a beam on uplink. Example techniques disclosed herein facilitate selecting a UE beam based on service demands of the UE. For example, techniques disclosed herein monitor for an occurrence of a UE beam selection triggering event and facilitate the selecting of a UE beam when a UE beam selection trigger event is detected. In some examples, the UE may detect a UE beam selection triggering event based on a target transmit power. In some examples, the UE may detect a UE beam selection triggering event based on an amount of data in a buffer for transmitting via uplink.

Figure 4:
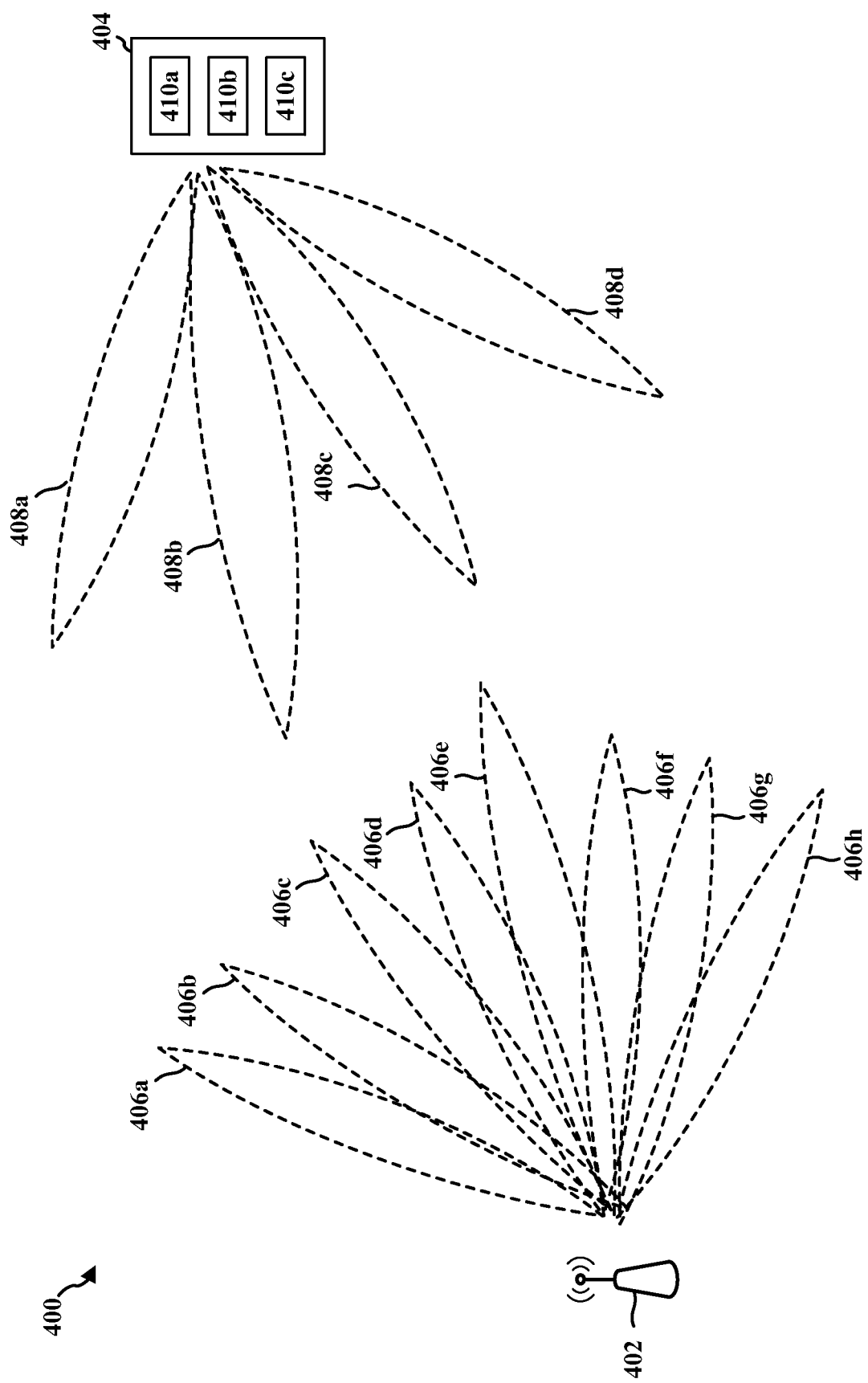
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 406a, 406b, 406c, 406d, 406e, 406f, 406g, 406h (collectively referred to herein as "directions 406"). The UE 404 may receive the beamformed signal from the base station 402 in one or more receive directions 408a, 408b, 408c, 408d (collectively referred to herein as "directions 408"). The UE 404 may also transmit a beamformed signal to the base station 402 in one or more of the directions 408. The base station 402 may receive the beamformed signal from the UE 404 in one or more of the receive directions 406. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In the illustrated example of FIG. 4, the UE 404 includes three antenna elements 410a, 410b, 410c (collectively referred to herein as "antenna elements 410"). Each of the antenna elements 410 may be coupled to a power amplifier (PA) that provides a physical limit of radio frequency power that may be emitted by the respective antenna element 410.

In some examples, a beam may be associated with any suitable quantity of antenna elements 410. For example, the UE 404 may transmit a beam in the transmit direction 408c, and the respective beam may be a one-element beam (e.g., a beam associated with one antenna element, such as the antenna element 410a), a two-element beam (e.g., a beam associated with two antenna elements, such as the antenna elements 410a, 410b), or a three-element beam (e.g., a beam associated with the three antenna elements 410a, 41b, 410c). In some such examples, beamforming enables applying different weights and/or phase-shifts to the signals output by the respective antenna elements 410 so that the signals are phase-aligned when received at the receiving device (e.g., the base station 402).

In some examples, transmitting via a one-element beam may be sufficient to enable the uplink transmission to be properly received at the base station 402. In other examples, it may be beneficial to transmit with a relatively higher transmit power. As described above, each antenna element may be associated with a physical limit of how much power may be emitted by the respective antenna element. Thus, to increase the transmit power (e.g., the maximum EIRP capability of the beam), the UE 402 may transmit via a beam associated with a relatively larger quantity of elements (e.g., a two-element beam, a three-element beam, etc.). While inefficiencies in beamforming may result in a transmit beam having a transmit power less than the maximum EIRP capability of the multi-element beam, it may be appreciated that having the opportunity to transmit at the relatively higher transmit power associated with the multi-element beam may be beneficial than to be limited to transmitting via a single-element beam or a relatively-low quantity element beam.

Furthermore, it may be appreciated that while a certain beam may be associated with a relatively larger quantity of antenna elements, thereby resulting in a relatively large maximum EIRP capability, each of the beams may also associated with a direction. Thus, in some examples, a first beam (e.g., a first beam direction 408a) having a relatively higher EIRP capability than a second beam (e.g., a second beam direction 408d) may not be selected if, for example, the direction of the first beam is not in the same direction (or roughly in the same direction) as the current beam (e.g., a third beam direction 408c).

Although the example diagram 400 of FIG. 4 illustrates the UE 404 including three antenna elements 410, in additional or alternative examples, the base station 402 may also include any suitable quantity of antenna elements for facilitating the transmitting of downlink transmissions and/or the receiving of uplink transmissions. Furthermore, while the diagram 400 illustrates the UE 404 including three antenna elements 410, in additional or alternative examples, the UE 404 may include any suitable quantity of antenna elements for facilitating the transmitting of uplink transmissions and/or the receiving of downlink transmissions.

Figure 5:
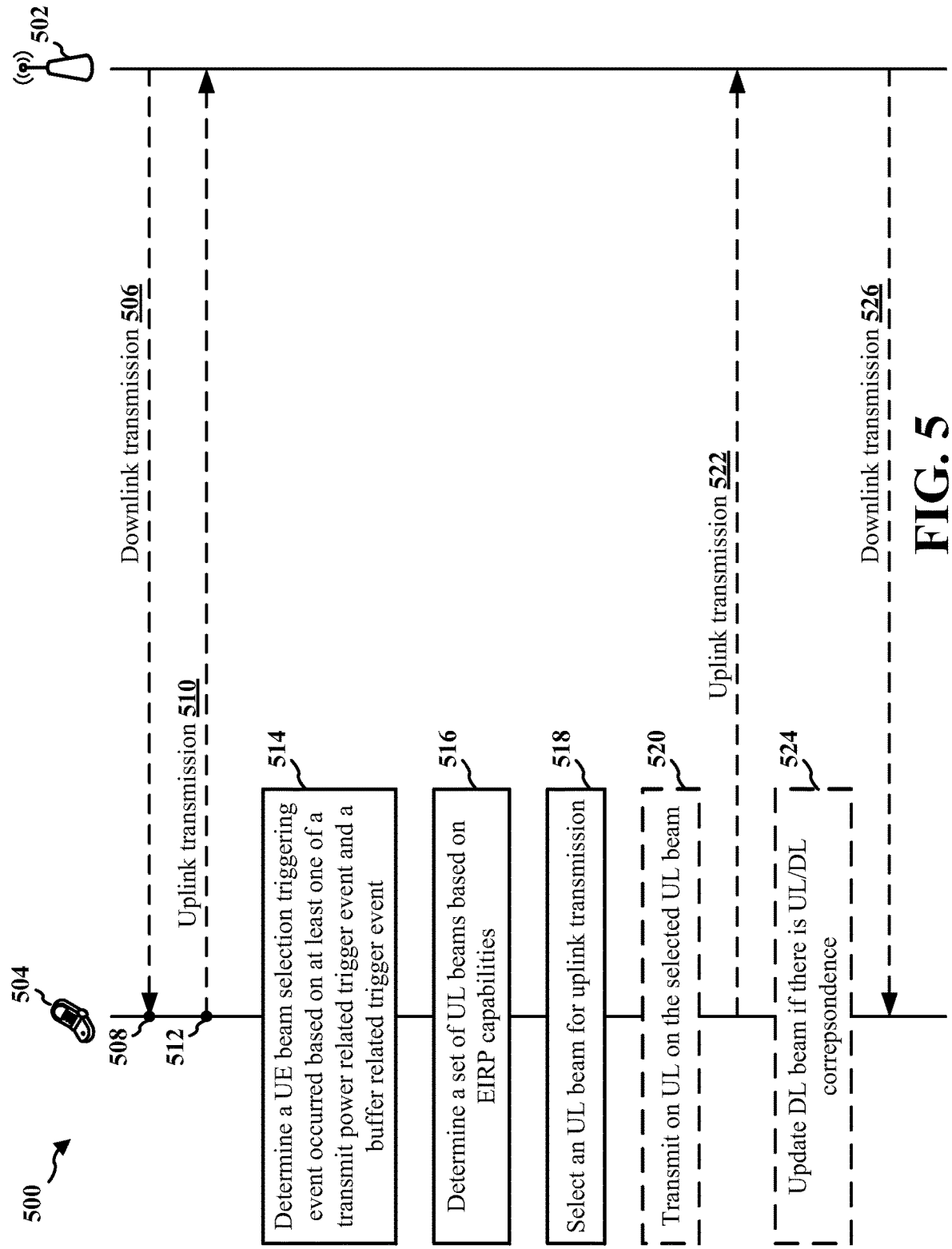
FIG. 5 is an example communication flow between a base station and a UE, in accordance with the teachings disclosed herein.

FIG. 5 illustrates an example communication flow 500 between a base station 502 and a UE 504, as presented herein. In the illustrated example, the communication flow 500 facilitates the UE 504 selecting an UL beam for uplink transmission. Aspects of the base station 502 may be implemented by the base station 102/180 of FIG. 1, the base station 310 of FIG. 3, and/or the base station 402 of FIG. 4. Aspects of the UE 504 may be implemented by the UE 104 of FIG. 1, the UE 350 of FIG. 3, and/or the UE 404 of FIG. 4. Although not shown in the illustrated example of FIG. 5, it may be appreciated that in additional or alternative examples, the base station 502 may be in communication with one or more other base stations or UEs, and/or the UE 504 may be in communication with one or more other base stations or UEs. Moreover, while certain of the transmissions between the base station 502 and the UE 504 are described as uplink transmissions and downlink transmissions, in other examples, any of the transmissions may additionally or alternatively be sidelink transmissions.

In the illustrated example, the base station 502 and the UE 504 are in communication. For example, the base station 502 may transmit downlink transmission(s) 506 that are received by the UE 504 and/or the UE 504 may transmit uplink transmission(s) 510 that are received by the base station 502. In the illustrated example, the UE 504 receives the downlink transmission(s) 506 on a current DL beam 508, and transmits the uplink transmission(s) 510 on a current UL beam 512. In some examples, the current DL beam 508 and the current UL beam 512 may be the same beam (e.g., the UE 504 is operating with UL/DL correspondence). As described above in connection with FIG. 4, the current DL beam 508 and the current UL beam 512 may be associated with a current EIRP capability and a beamforming direction (sometimes referred to as a "transmit direction," a "receive direction," or "spatial attributes").

While in communication with the base station 502, the UE 504, at 514, determines that a UE beam selection triggering event occurred based on a transmit power trigger event and/or a buffer-related trigger event. In the illustrated example, the transmit power trigger event and the buffer-related trigger event are UL-centric service demands for which a strong UE transmit power may be beneficial.

After determining that a UE beam selection triggering event occurred, at 516, the UE 504 determines a set of UL beams based on EIRP capabilities of the different UL beams. In some examples, each UL beam of the set of UL beams may be associated with one or more of the same or similar characteristics as the current beam. For example, the beamforming direction of each UL beam of the set of UL beams may be the same direction (or roughly the same direction) as the beamforming direction associated with the current beam. In some examples, the UL beam(s) of the set of UL beams may be associated with an EIRP that is relatively the same as the EIRP as the current beam. For example, the EIRP of the UL beam(s) of the set of UL beams may be the same or less than the EIRP of the current beam. In other examples, the EIRP of the UL beam(s) of the set of UL beams may be the same or greater than the EIRP of the current beam.

At 518, the UE 504 may select one of the UL beams from the set of UL beams for uplink transmissions.

At 520, the UE 504 may transmit an uplink communication using the selected UL beam. For example, the UE 504 may transmit uplink transmission 522 using the selected UL beam.

At 524, the UE 504 may update the DL beam for receiving downlink transmissions.

For example, if the UE 504 employs UL/DL correspondence, the UE 504 may update the DL beam (e.g., the DL beam 508) to use for receiving downlink transmissions to be the same beam as the selected UL beam (at 518). The UE 504 may then receive a downlink transmission 526 via the updated DL beam.

In some examples, the UE 504 may determine, at 514, that a UE beam selection triggering event occurred based on a transmit power-related trigger event. For example, the UE 504 may receive (e.g., via the downlink transmission 506 from the base station 502) a transmit power control (TPC) instructing the UE 504 to transmit at a target transmit power. The TPC may include an explicit target transmit power (e.g., transmit at 11 dB) or may include a relative (or a change in) target transmit power (e.g., an instruction to increase target transmit power by 3 dB). If the target transmit power exceeds the EIRP capability of the current UL beam 512, the UE 504 determines that the UE beam selection triggering event occurred. The target transmit power may correspond to uplink control traffic (e.g., a PUCCH) and/or uplink data traffic (e.g., a PUSCH).

In some examples, the UE 504 may determine, at 514, that a UE beam selection triggering event occurred based on a buffer-related event. For example, the UE 504 may monitor a buffer status report (BSR) to determine when an amount of data for transmitting via uplink is greater than a data threshold. In such examples, when the UE 504 has data to transmit via uplink, it may be beneficial to select a relatively good UL beam instead of using the same beam as the DL beam. In some examples, the data threshold may be zero bytes. In such examples, when the BSR includes (or indicates) any amount of data for uplink transmission, the UE 504 may determine that a UE beam selection triggering event occurred. In some examples, the data threshold may be a non-zero value (e.g., greater than zero bytes). In such examples, when the BSR includes (or indicates) an amount of data for uplink transmission that is greater than the non-zero value, then the UE 504 may determine that a UE beam selection triggering event occurred.

In some examples, the UE 504 may determine, at 516, the set of UL beams based on their respective EIRP capabilities and an EIRP capability threshold. In some such examples, the EIRP capability threshold may be based on the target transmit power. For example, if the target transmit power is 11 dB, then the EIRP capability threshold may also be configured as 11 dB, and the UE 504 may determine the set of UL beams by identifying one or more UL beams with an EIRP capability that is greater than (or equal to) the EIRP capability threshold (e.g., greater than (or equal to) 11 dB).

In some examples, the UE 504 may determine, at 516, the set of UL beams based on their respective EIRP capabilities and a maximum EIRP capability. For example, when the UE 504 determines that there is a threshold quantity of data to transmit on uplink (e.g., an amount greater than the data threshold), the UE 504 may determine the set of UL beams by identifying one or more UL beams with EIRP capabilities that are greater than the EIRP capability associated with the current UL beam 512.

In some examples, the UE 504 may determine, at 516, the set of UL beams by identifying the UL beam with the highest relative EIRP capability. That is, in some examples, the set of UL beams may include one UL beam (e.g., the UL beam with the highest relative EIRP capability), which the UE 504 may then select, at 518 as the UL beam to use to transmit an uplink communication (e.g., the uplink transmission 522).

In some examples, the UE 504 may determine, at 516, the set of UL beams based on beamforming directions associated with the respective UL beams. For example, the current beam may be associated with a beamforming direction and the UE 504 may identify one or more UL beams associated with a beamforming direction that is the same (or nearly the same) as the beamforming direction associated with the current beam.

In some examples, the UE 504 may determine, at 516, the set of UL beams based on their respective EIRP capabilities and their respective beamforming directions. For example, the UE 504 may identity one or more UL beams that have a satisfactory EIRP capability (e.g., based on an EIRP capability threshold, a maximum EIRP capability, and/or a highest relative EIRP capability) and/or that are associated with a beamforming direction that is the same (or nearly the same) as the beamforming direction associated with the current beam for including in the set of UL beams.

It may be appreciated that when the UE 504 is determining, at 516, the set of UL beams, the set of UL beams may include one UL beam (e.g., an UL beam with the highest relative EIRP capability) and/or may include a plurality of UL beams (e.g., two or more UL beams with EIRP capabilities that are greater than the EIRP capability of the current UL beam 512).

In some examples, the UE 504 may select, at 518, the UL beam for uplink transmissions from the set of UL beams (as determined at 516). In some examples, the UE 504 may select the UL beam as the UL beam from the set of UL beams with the highest relative EIRP capability. In some examples, the UE 504 may select the UL beam associated with an EIRP that is the same or less than the EIRP of the current beam. In some such examples, the UE 504 may select, at 518, the UL beam associated with a pathloss larger than a pathloss associated with the UL beam for uplink transmissions. In some examples, the UE 504 may select the UL beam associated with an EIRP that is the same or greater than the EIRP of the current beam. In some such examples, the UE 504 may select, at 518, the UL beam associated with a pathloss smaller than a pathloss associated with the UL beam for uplink transmissions. In some examples, the UE 504 may select the UL beam from the set of UL beams that is associated with a same (or nearly same) beamforming direction as the beamforming direction of the current beam (e.g., the current UL beam 512).

In some examples, the transmit power-related trigger event may be detected based on TPC associated with a PUSCH and/or TPC associated with a PUCCH. In some examples, the buffer-related trigger event may be detected based on PUSCH. For example, the UE 504 may transmit control information and/or ACK/NACK for DL traffic. In some such examples, it may not be beneficial for the UE to select a beam associated with a relatively higher EIRP capability than the current UL beam 512 to facilitate the transmitting of the control information. Thus, as disclosed here, the buffer-related trigger event may be directed to an amount of PUSCH data. However, it may be appreciated that in additional or alternative examples, the buffer-related trigger event may be associated with any type of uplink traffic (e.g., data, control, ACK/NACK, etc.).

Figure 6:
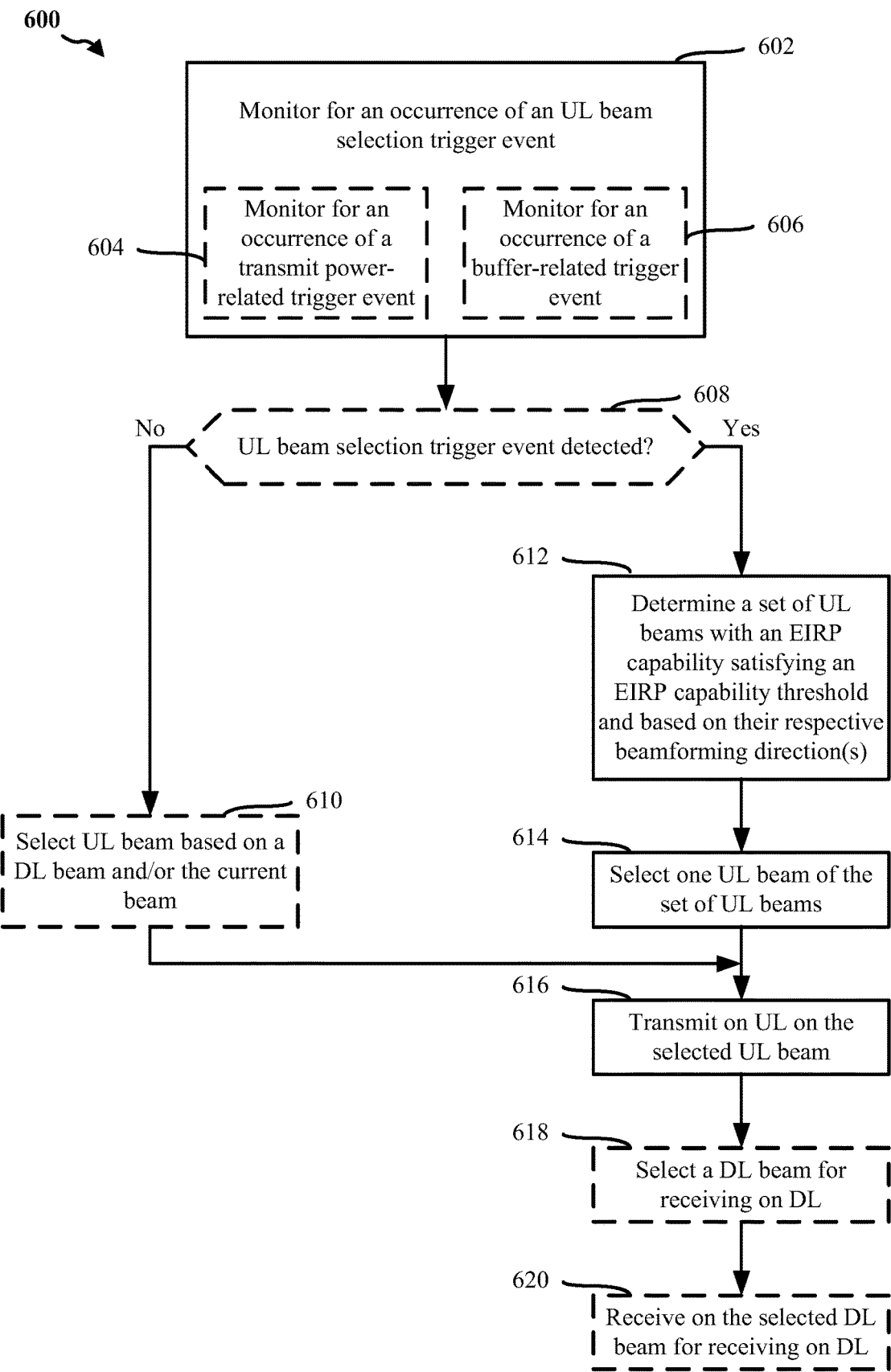
FIG. 6 is a flowchart of a method of wireless communication at a UE.

FIG. 6 is a flowchart 600 of a method of wireless communication. The method may be performed by a UE or a component of a UE (e.g., the UE 104, the UE 350, the UE 404, and/or the UE 504; the apparatus 702, a processing system, which may include the memory 360 and which may be the entire UE 350 or a component of the UE 350, such as the TX processor 368, the RX processor 356, and/or the controller/processor 359). Optional aspects are illustrated with a dashed line. The method may facilitate improving cell coverage and/or increased throughput by enabling a UE to select an UL beam based on UL service demands of the UE.

At 602, the UE may monitor for an occurrence of an UL beam selection trigger event, as described above in connection with, for example, 514 of FIG. 5. For example, a trigger determination component 740 of apparatus 702 of FIG. 7 may facilitate the monitoring for the occurrence of the UL beam selection trigger event.

In some examples, at 604, the UE may determine to select an UL beam having a higher EIRP capability by monitoring for an occurrence of a transmit power-related trigger event. For example, a target transmit power monitoring component 742 of the apparatus 702 of FIG. 7 may facilitate the monitoring for an occurrence of a transmit power-related trigger event. In some examples, the UE may monitor when a target transmit power based on a TPC exceeds an EIRP capability associated with the current beam. In some examples, the UE may receive TPC information (e.g., from a base station) and determine a target transmit power based on the TPC. The UE may then determine whether the target transmit power exceeds the EIRP capability associated with the current beam. In some examples, the target transmit power monitoring component 742 may output a signal indicating whether or not the target transmit power exceeds the EIRP capability of the current beam.

In some examples, at 606, the UE may determine to select an UL beam having a higher EIRP capability by monitoring for an occurrence of a buffer-related trigger event. For example, a buffer monitoring component 744 of the apparatus 702 of FIG. 7 may facilitate the monitoring for a buffer-related trigger event. In some examples, the UE may monitor for when an amount of data in the buffer is greater than the data threshold. In some examples, the data in the buffer (e.g., the BSR) corresponds to uplink data for transmission via PUSCH. In some examples, the data threshold is equal to zero bytes. In some examples, the data threshold is greater than zero bytes. In some examples, the buffer monitoring component 744 may output a signal indicating whether or not the amount of data in the buffer exceeds the data threshold.

At 608, the UE determines whether an UL beam selection trigger event is detected, as described above in connection with, for example, 514 of FIG. 5. For example, the trigger determination component 740 may determine when an UL beam selection trigger event is detected, for example, based on a signal output by the target transmit power monitoring component 742 and/or a signal output by the buffer monitoring component 744. In some examples, the UE may determine that an UL beam selection trigger event occurs when a target transmit power based on TPC exceeds the EIRP capability associated with the current beam. In some examples, the UE may determine that an UL beam selection trigger event occurs when an amount of data in the buffer of the UE is greater than the data threshold.

If, at 608, the UE does not detect an UL beam selection trigger event (e.g., the target transmit power does not exceed the EIRP capability associated with the current beam and the amount of data in the buffer does not exceed the data threshold), then, at 610, the UE may select the UL beam based on the DL beam and/or may continue to use the same UL beam as the current beam. For example, an UL beam selection component 748 of the apparatus 702 of FIG. 7 may facilitate the selecting of the UL beam. In the illustrated example, control then proceeds to 616 to facilitate transmitting on UL on the selected UL beam.

If, at 608, the UE detects an UL beam selected trigger event (e.g., the target transmit power based on the TPC exceeds the EIRP capability associated with the current beam and/or the amount of data in the buffer of the UE is greater than the data threshold), then, at 612, the UE determines a set of UL beams with an EIRP capability satisfying an EIRP capability threshold and based on their respective beamforming direction(s), as described above in connection with, for example, 516 of FIG. 5. For example, an UL beam set determination component 746 of the apparatus 702 of FIG. 7 may facilitate the determining of the set of UL beams. In some examples, the set of UL beams may include one UL beam associated with the highest EIRP capability relative to the other EIRP capabilities of the other UL beams. In some examples, the EIRP capability threshold may be based on the target transmit power after determining that the target transmit power based on the TPC exceeds the EIRP capability associated with the current beam. In some examples, the EIRP capability threshold may be based at least on a maximum EIRP capability. In some examples, each of the UL beams included in the set of UL beams is associated with a beamforming direction that is the same as (or nearly the same as) the beamforming direction associated with the current beam.

At 614, the UE selects one UL beam of the set of UL beams, as described above in connection with, for example, 518 of FIG. 5. For example, the UL beam selection component 748 may facilitate the selecting of the one UL beam. In some examples, the UE may select the one UL beam from the set of UL beams by identifying an UL beam associated with a beamforming direction that is the same (or nearly the same as) as a beamforming direction associated with the current beam. In some examples, the UE may select the one UL beam from the set of UL beams by identifying an UL beam associated with an EIRP that is less than the EIRP of the current beam. In some examples, the UE may select the one UL beam from the set of UL beams by identifying an UL beam associated with an EIRP that is greater than the EIRP of the current beam. In some examples, the UE may select the one UL beam from the set of UL beams by identifying an UL beam associated with a smaller relative pathloss. For example, the UE may select the one UL beam from the set of UL beams associated with a pathloss smaller than the pathloss associated with the current beam. It may be appreciated that in some examples, the UE may select the UL beam from the set of UL beams associated with the smallest pathloss. In some examples, the UE may select the one UL beam from the set of UL beams by identifying an UL beam associated with a larger relative pathloss. For example, the UE may select the one UL beam from the set of UL beams associated with a pathloss larger than the pathloss associated with the current beam.

At 616, the UE transmits on UL on the selected UL beam, as described above in connection with, for example, 520 and the uplink transmission 522 of FIG. 5. For example, a transmission component 734 of the apparatus 702 of FIG. 7 may facilitate the transmitting on UL on the selected UL beam. In some examples, the selected UL beam is based on the detection of the UL beam selection trigger. In some examples, the selected UL beam is based on the DL beam and/or the current beam.

At 618, the UE may select a DL beam for receiving on DL based on the selected UL beam, as described above in connection with, for example, 524 of FIG. 5. For example, a DL beam selection component 750 of the apparatus 702 of FIG. 7 may facilitate the selecting of the DL beam. In some examples, the selected DL beam may be the same as the selected UL beam. In some examples, the UE may select the DL beam based on the selected UL beam when there is UL/DL correspondence. In some examples, when the UE does not detect the occurrence of an UL beam selection trigger event (e.g., the target transmit power does not exceed the EIRP capability associated with the current beam and the amount of data in the buffer does not exceed the data threshold), the UE may maintain the current beam as the DL beam.

At 620, the UE may receive, from the base station, on the selected DL beam for receiving on DL, as described above in connection with, for example, 526 of FIG. 5. For example, a reception component 730 of the apparatus 702 of FIG. 7 may facilitate the receiving on DL on the selected DL beam.

Figure 7:
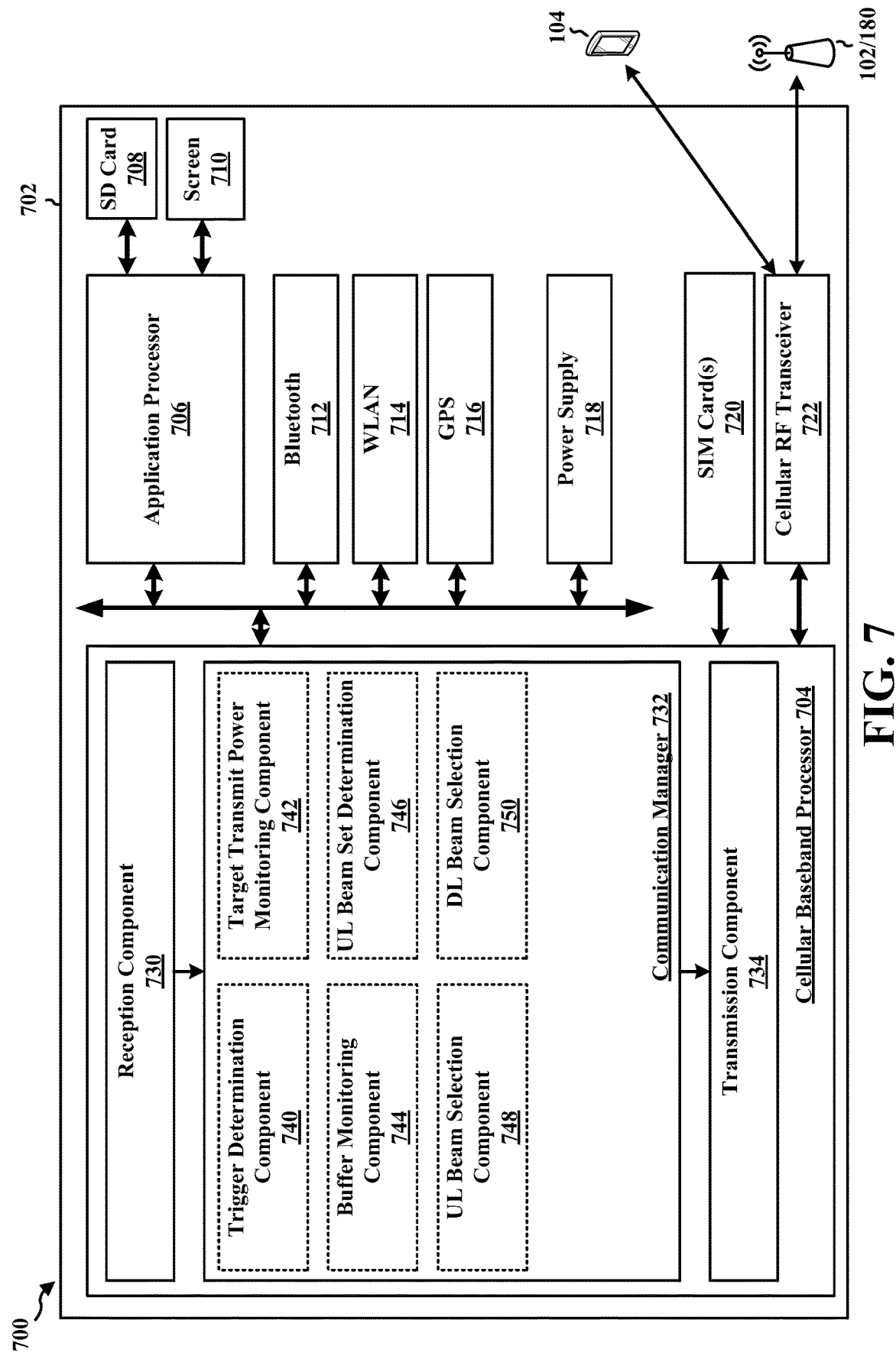
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or base station 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see the UE 350 of FIG. 3) and include the aforediscussed additional modules of the apparatus 702.

The communication manager 732 includes a trigger determination component 740, a target transmit power monitoring component 742, a buffer monitoring component 744, an UL beam set determination component 746, an UL beam selection component 748, and a DL beam selection component 750.

The trigger determination component 740 may be configured to facilitate the determining to select an UL beam having a higher EIRP capability than an EIRP capability associated with a current beam for transmitting on UL, e.g., as described above in connection with 608 of FIG. 6.

The target transmit power monitoring component 742 may be configured to facilitate the monitoring for an occurrence of a transmit power-related trigger event, e.g., as described above in connection with 604 of FIG. 6.

The buffer monitoring component 744 may be configured to facilitate the monitoring for an occurrence of a buffer-related trigger event, e.g., as described above in connection with 606 of FIG. 6.

The UL beam set determination component 746 may be configured to facilitate the determining of the set of UL beams, e.g., as described above in connection with 612 of FIG. 6.

The UL beam selection component 748 may be configured to facilitate the selecting of the one UL beam, e.g., as described above in connection with 610 and/or 614 of FIG. 6.

The DL beam selection component 750 may be configured to facilitate the selecting of the DL beam, e.g., as described above in connection with 618 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for performing any of the aspects of the method of FIG. 6.

The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with aspects of other embodiments or teachings described herein, without limitation.

Example 1 is a method of wireless communication at a UE, comprising: determining to select an UL beam having a higher EIRP capability than an EIRP capability associated with a current beam for transmitting on UL when at least one of a target transmit power based on TPC exceeds an EIRP capability associated with the current beam or when an amount of data in a buffer of the UE is greater than a data threshold; determining, upon determining to select the UL beam, a set of UL beams with an EIRP capability satisfying an EIRP capability threshold and a respective beamforming direction corresponding to a beamforming direction associated with the current beam; selecting one UL beam of the set of UL beams; and transmitting on UL on the selected UL beam.

In Example 2, the method of Example 1 further includes: selecting a DL beam for receiving on DL based on the selected UL beam; and receiving, from a base station, on the selected DL beam for receiving on DL.

In Example 3, the method of any of Example 1 or Example 2 further includes that the selected DL beam is the same as the selected UL beam.

In Example 4, the method of any of Examples 1 to 3 further includes that the selecting of the DL beam based on the selected UL beam is performed when there is UL/DL beam correspondence.

In Example 5, the method of any of Examples 1 to 4 further includes that the data threshold is zero bytes or greater than zero bytes.

In Example 6, the method of any of Examples 1 to 5 further includes that the set of UL beams comprises one UL beam with a highest EIRP capability.

In Example 7, the method of any of Examples 1 to 6 further includes that the EIRP capability threshold is based on the target transmit power after determining that the target transmit power based on the TPC exceeds the EIRP capability associated with the current beam.

In Example 8, the method of any of Examples 1 to 7 further includes that the EIRP capability threshold is based at least on a maximum EIRP capability.

In Example 9, the method of any of Examples 1 to 8 further includes that the selecting of the one UL beam of the set of UL beams includes identifying an UL beam associated with an EIRP that is relatively the same as an EIRP associated with the current beam.

In Example 10, the method of any of Examples 1 to 9 further includes that the EIRP of the UL beam is the same or less than the EIRP associated with the current beam.

In Example 11, the method of any of Examples 1 to 10 further includes that the selecting of the one UL beam of the set of UL beams includes identifying an UL beam associated with a pathloss larger than a pathloss associated with the current beam.

In Example 12, the method of any of Examples 1 to 11 further includes that the EIRP of the UL beam is the same or greater than the EIRP associated with the current beam.

In Example 13, the method of any of Examples 1 to 12 further includes that the selecting of the one UL beam of the set of UL beams includes identifying an UL beam associated with a pathloss smaller than a pathloss associated with the current beam.

Example 14 is a device including one or more processors and one or more memories in electronic communication with the one or more processors storing instructions executable by the one or more processors to cause a system or an apparatus to implement a method as in any of Examples 1 to 13.

Example 15 is a system or apparatus including means for implementing a method or realizing an apparatus as in any of Examples 1 to 13.

Example 16 is a non-transitory computer-readable medium storing instructions executable by one or more processors to cause the one or more processors to implement a method as in any of Examples 1 to 13.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   communicating on a current uplink (UL) beam, wherein the current UL beam is associated with a current beamforming direction;
   identifying a first UL beam having a higher effective isotropic radiated power (EIRP) capability than a current beam EIRP capability associated with the current UL beam when an amount of data in a buffer of the UE is greater than a data threshold, the data threshold being greater than zero bytes; and
   transmitting an UL communication on the first UL beam.

2. The method of claim 1, further comprising:
   selecting a first downlink (DL) beam based on the first UL beam; and
   receiving, from a base station, a DL communication on the first DL beam.

3. The method of claim 2, wherein the first DL beam is a same beam as the first UL beam.

4. The method of claim 2, wherein selecting the first DL beam based on the first UL beam is performed when there is UL/DL beam correspondence.

5. The method of claim 1, further comprising:
   identifying a set of UL beams, each UL beam of the set of UL beams being associated with a respective EIRP capability satisfying an EIRP capability threshold,
   wherein the first UL beam is identified from the set of UL beams.

6. The method of claim 1, wherein an EIRP capability of the first UL beam is based on a first quantity of antenna elements associated with the first UL beam, and wherein the first UL beam has the higher EIRP capability than the current beam EIRP capability associated with the current UL beam when the first quantity of the antenna elements associated with the first UL beam is greater than a second quantity of the antenna elements associated with the current UL beam.

7. The method of claim 1, wherein an EIRP capability of the first UL beam is higher than the current beam EIRP capability associated with the current UL beam when a first quantity of antenna elements associated with the first UL beam is greater than a second quantity of the antenna elements associated with the current UL beam.

8. The method of claim 1, wherein identifying the first UL beam having the higher EIRP capability than the current beam EIRP capability associated with the current UL beam comprises:
   identifying the first UL beam having a first quantity of antenna elements that is greater than a second quantity of the antenna elements associated with the current UL beam.

9. The method of claim 1, further comprising identifying the first UL beam when a target transmit power based on a transmit power command (TPC) exceeds the current beam EIRP capability.

10. The method of claim 9, wherein the target transmit power exceeds the current beam EIRP capability when the target transmit power exceeds a transmit power associated with the current UL beam, and wherein the transmit power associated with the current UL beam is based on a quantity of antenna elements associated with the current UL beam.

11. The method of claim 9, wherein the current beam EIRP capability is represented by a quantity of antenna elements associated with the current UL beam.

12. The method of claim 1, wherein the first UL beam is identified based on the first UL beam having a first beamforming direction that is more similar to the current beamforming direction than a second beamforming direction of a second UL beam, the second UL beam having a second EIRP capability that is higher than the current beam EIRP capability associated with the current UL beam.

13. The method of claim 1, further comprising:
   monitoring a buffer status report (BSR) to determine when the amount of data in the buffer of the UE is greater than the data threshold.

14. An apparatus for wireless communication at a user equipment (UE), comprising:
   means for communicating on a current uplink (UL) beam, wherein the current UL beam is associated with a current beamforming direction;
   means for identifying a first UL beam having a higher effective isotropic radiated power (EIRP) capability than a current beam EIRP capability associated with the current UL beam when an amount of data in a buffer of the UE is greater than a data threshold, the data threshold being greater than zero bytes; and
   means for transmitting an UL communication on the first UL beam.

15. The apparatus of claim 14, further comprising:
means for selecting a first downlink (DL) beam based on the first UL beam; and
means for receiving, from a base station, a DL communication on the first DL beam.

16. An apparatus for wireless communication at a user equipment (UE), comprising:
a memory; and
at least one processor coupled to the memory and configured to:
communicate on a current uplink (UL) beam, wherein the current UL beam is associated with a current beamforming direction;
identify a first UL beam having a higher effective isotropic radiated power (EIRP) capability than a current beam EIRP capability associated with the current UL beam when an amount of data in a buffer of the UE is greater than a data threshold, the data threshold being greater than zero bytes; and
transmit an UL communication on the first UL beam.

17. The apparatus of claim 16, wherein the at least one processor is further configured to:
select a first downlink (DL) beam based on the first UL beam; and
receive, from a base station, a DL communication on the first DL beam.

18. The apparatus of claim 17, wherein the first DL beam is a same beam as the first UL beam.

19. The apparatus of claim 17, wherein the at least one processor is further configured to select the first DL beam based on the first UL beam when there is UL/DL beam correspondence.

20. The apparatus of claim 16, wherein the at least one processor is further configured to:
identify a set of UL beams, each UL beam of the set of UL beams being associated with a respective EIRP capability satisfying an EIRP capability threshold,
wherein the first UL beam is identified from the set of UL beams.

21. The apparatus of claim 16, wherein an EIRP capability of the first UL beam is based on a first quantity of antenna elements associated with the first UL beam, and wherein the first UL beam has the higher EIRP capability than the current beam EIRP capability associated with the current UL beam when the first quantity of the antenna elements associated with the first UL beam is greater than a second quantity of the antenna elements associated with the current UL beam.

22. The apparatus of claim 16, wherein an EIRP capability of the first UL beam is higher than the current beam EIRP capability associated with the current UL beam when a first quantity of antenna elements associated with the first UL beam is greater than a second quantity of the antenna elements associated with the current UL beam.

23. The apparatus of claim 16, wherein to identify the first UL beam having the higher EIRP capability than the current beam EIRP capability associated with the current UL beam, the at least one processor is further configured to:
identify the first UL beam having a first quantity of antenna elements that is greater than a second quantity of the antenna elements associated with the current UL beam.

24. The apparatus of claim 16, wherein the at least one processor is further configured to identify the first UL beam when a target transmit power based on a transmit power control (TPC) exceeds the current beam EIRP capability.

25. The apparatus of claim 24, wherein the target transmit power exceeds the current beam EIRP capability when the target transmit power exceeds a transmit power associated with the current UL beam, and wherein the transmit power associated with the current UL beam is based on a quantity of antenna elements associated with the current UL beam.

26. The apparatus of claim 24, wherein the current beam EIRP capability is represented by a quantity of antenna elements associated with the current UL beam.

27. The apparatus of claim 16, wherein the at least one processor is further configured to identify the first UL beam based on the first UL beam having a first beamforming direction that is more similar to the current beamforming direction than a second beamforming direction of a second UL beam, the second UL beam having a second EIRP capability that is higher than the current beam EIRP capability associated with the current UL beam.

28. The apparatus of claim 16, wherein the at least one processor is further configured to monitor a buffer status report (B SR) to determine when the amount of data in the buffer of the UE is greater than the data threshold.

29. A non-transitory computer-readable medium comprising computer executable instructions that, when executed by one or more processors of a user equipment (UE), cause the UE to perform a method of wireless communication, comprising:
communicating on a current uplink (UL) beam, wherein the current UL beam is associated with a current beamforming direction;
identifying a first UL beam having a higher effective isotropic radiated power (EIRP) capability than a current beam EIRP capability associated with the current UL beam when an amount of data in a buffer of the UE is greater than a data threshold the data threshold being greater than zero bytes; and
transmitting an UL communication on the first UL beam.

* * * * *